United States Patent [19]
Neff et al.

[11] 3,746,369
[45] July 17, 1973

[54] TRUCK TRACTOR CONVERTER DOLLY

[75] Inventors: Charles G. Neff, Saratoga, Calif.;
William F. Beebe, Holland, Mich.

[73] Assignee: Holland Hitch Company, Holland, Mich.

[22] Filed: Dec. 7, 1970

[21] Appl. No.: 95,457

[52] U.S. Cl.......................... 280/476 R, 280/438
[51] Int. Cl................................................ B62d 53/08
[58] Field of Search............... 280/476 R, 408, 477, 280/425, 482, 491, 483, 418, 407, 438

[56] References Cited
UNITED STATES PATENTS

| | | | |
|---|---|---|---|
| 3,246,912 | 4/1966 | Cunha | 280/408 |
| 2,590,962 | 4/1952 | Gurton | 280/476 R |
| 1,887,118 | 11/1932 | Collinge | 280/418 |
| 3,484,852 | 12/1969 | Norrie | 280/476 R |
| 3,420,390 | 1/1969 | Taggart | 280/477 |
| 3,216,735 | 11/1965 | Larson | 280/408 |
| 3,649,047 | 3/1972 | Plantan | 280/425 R |

*Primary Examiner*—Richard J. Johnson
*Assistant Examiner*—Robert R. Song
*Attorney*—Price, Heneveld, Huizenga & Cooper

[57] ABSTRACT

The structure disclosed herein is a convertor dolly usable alternatively attached to the rear of a truck tractor to form a tandem axle assembly therewith, or attached to the rear of a semi-trailer for hauling another trailer to the rear thereof. The dolly has a forwardly extending draw tongue assembly that is contractible for attachment of the tongue and dolly to a tractor, and extensible for attachment of the tongue and dolly to a trailer. The tongue is lockable in either position. When connected in tandem relation to a tractor, the dolly has limited rotational capacity to accommodate rough terrain without loss of drive traction. A fifth wheel on the dolly is specially vertically shiftable relative to the dolly frame, between a lowered non-coupling position when the dolly is attached in tandem to the tractor, and a raised coupling position when used to haul a second trailer. The dolly fifth wheel is specially supported and locked in its raised position.

14 Claims, 19 Drawing Figures

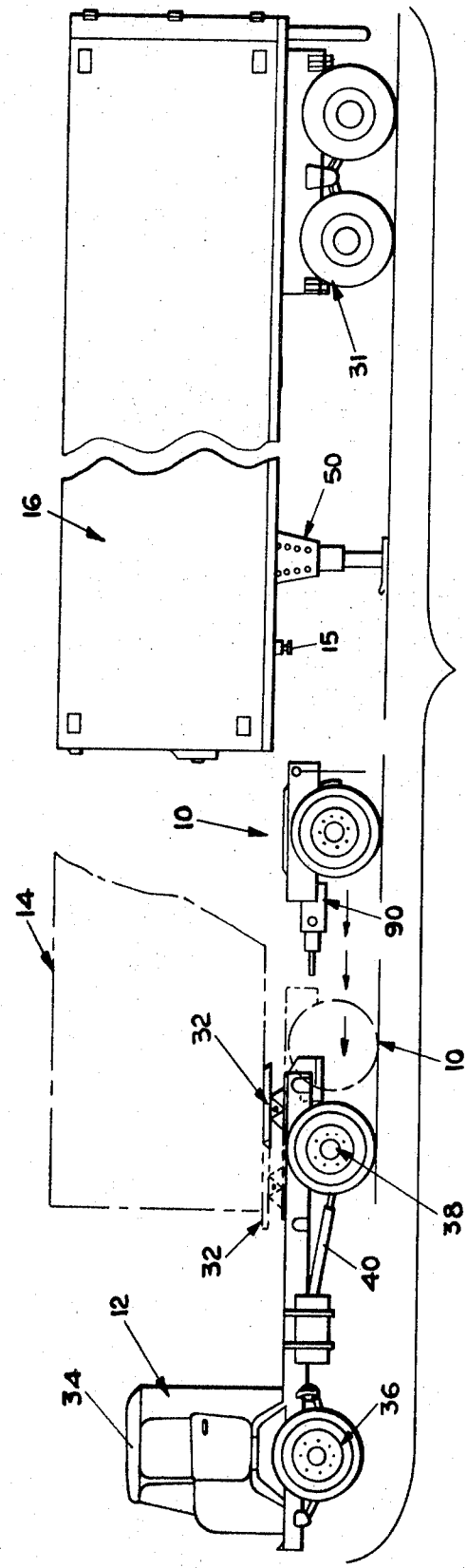
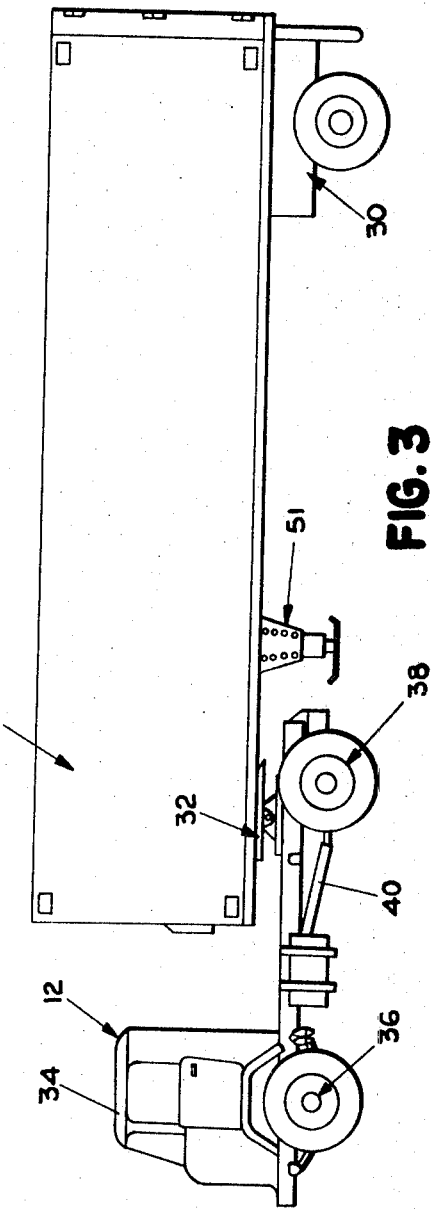

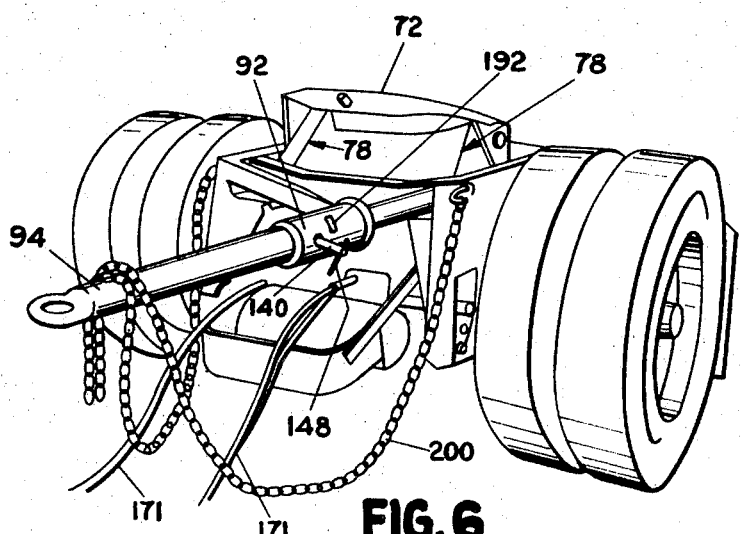
FIG. 6
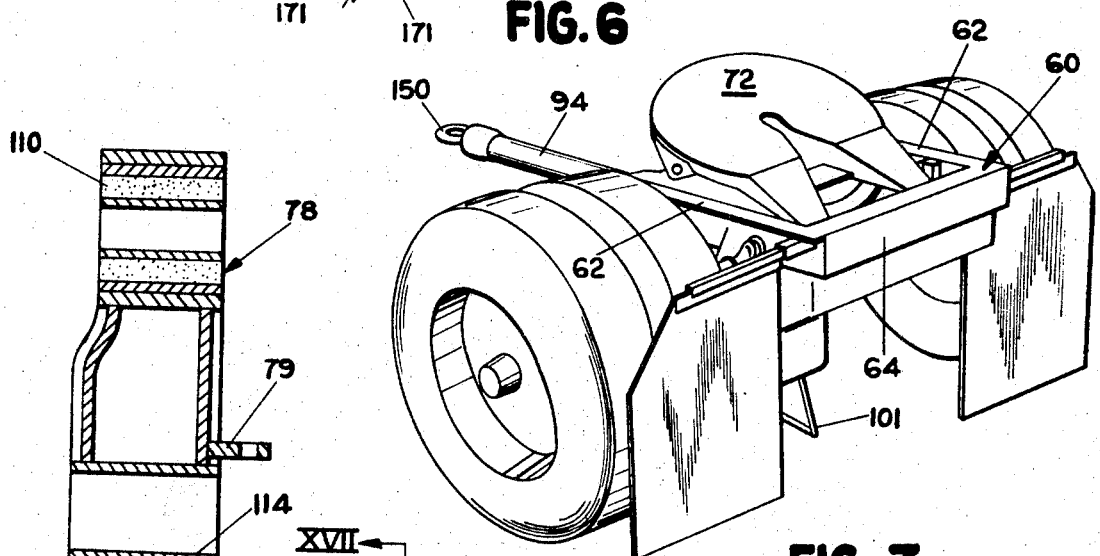
FIG. 17
FIG. 7
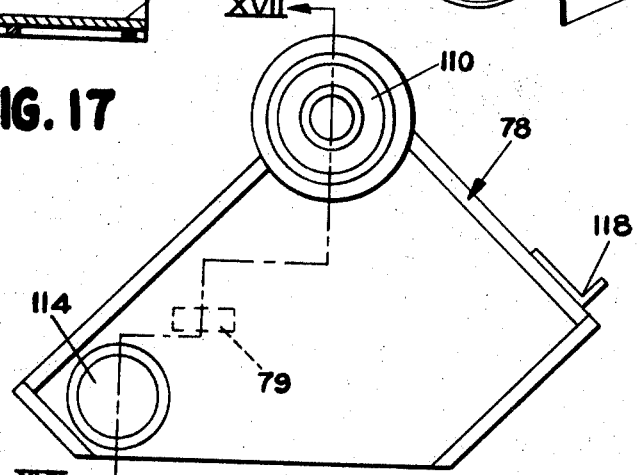
FIG. 16
INVENTORS
CHARLES G. NEFF
WILLIAM F. BEEBE
ATTORNEYS

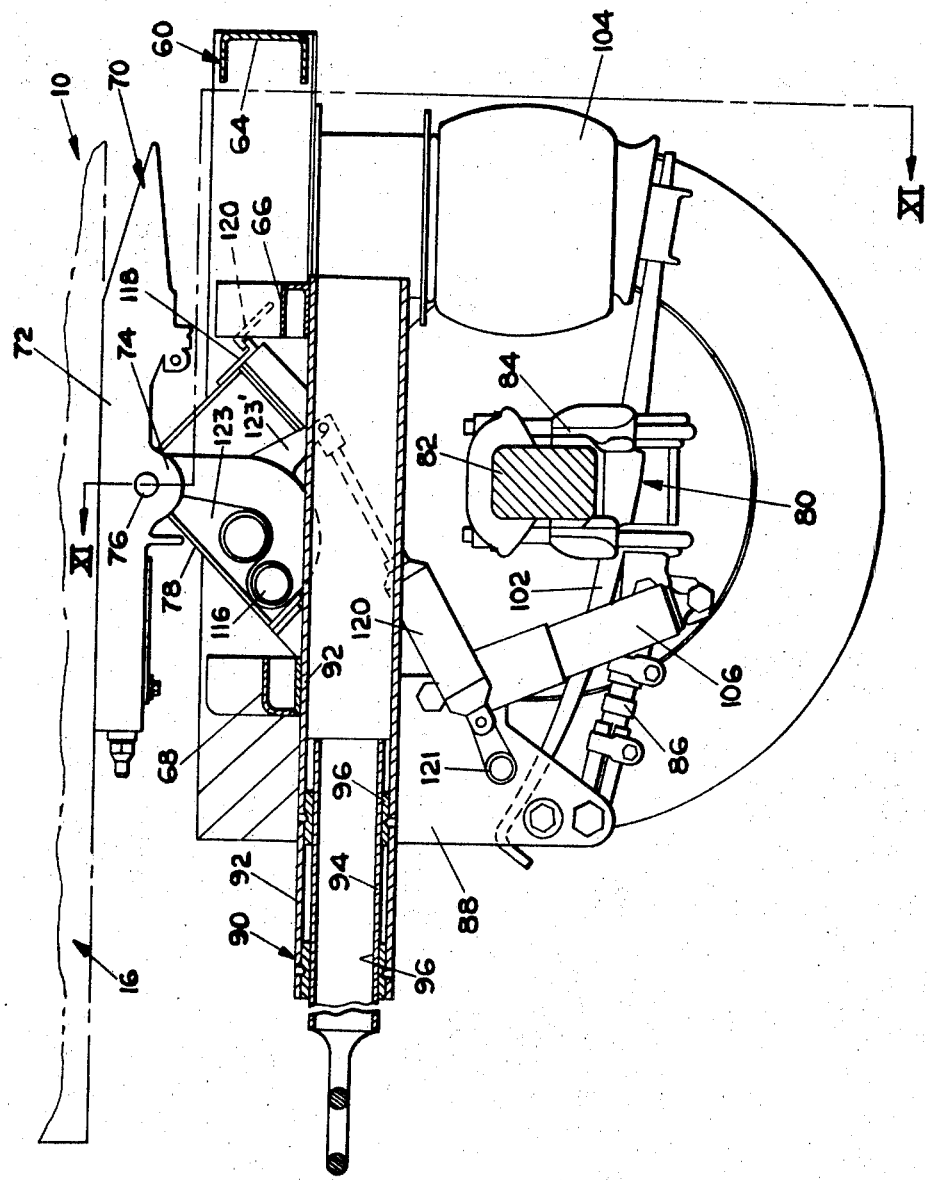

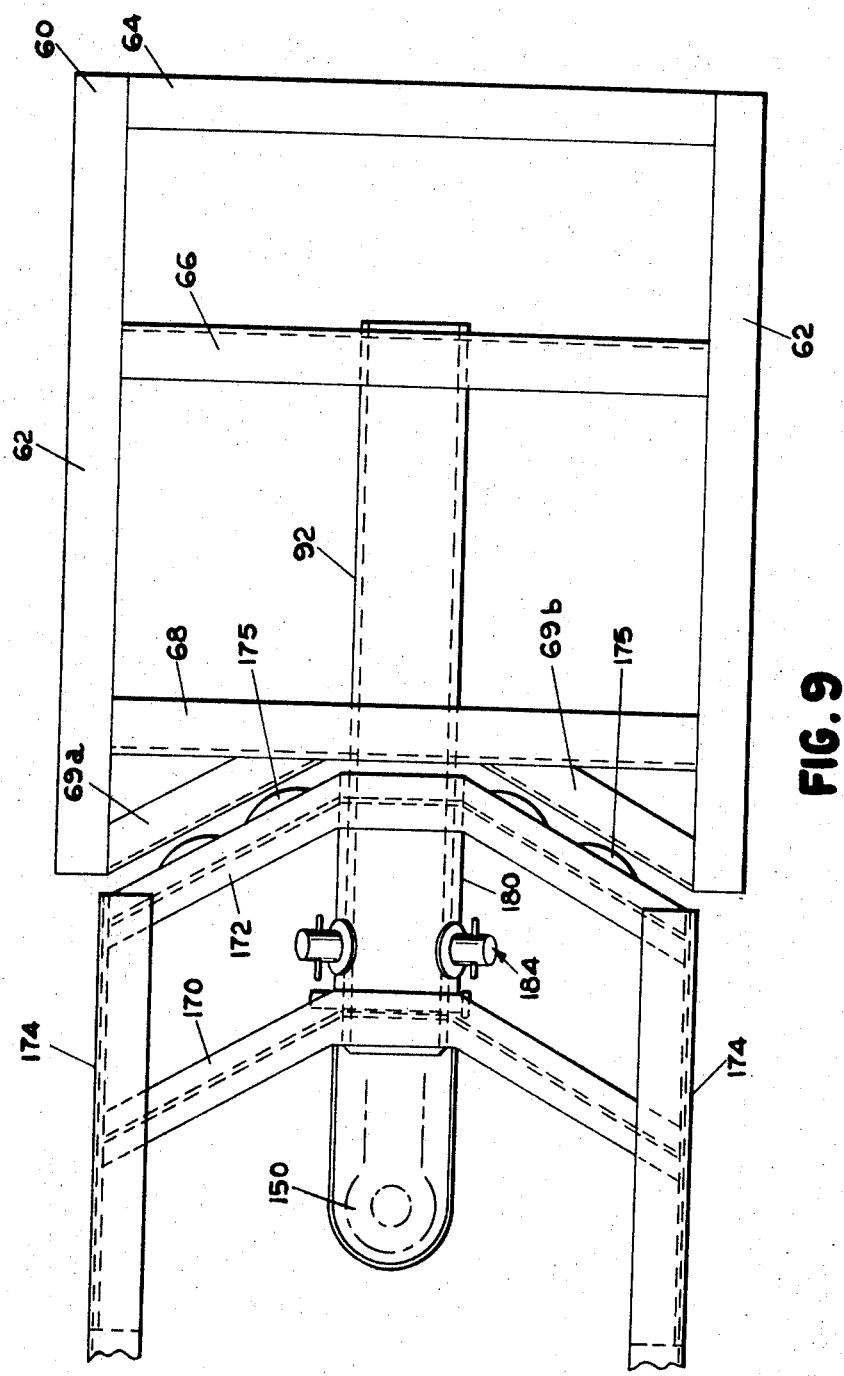

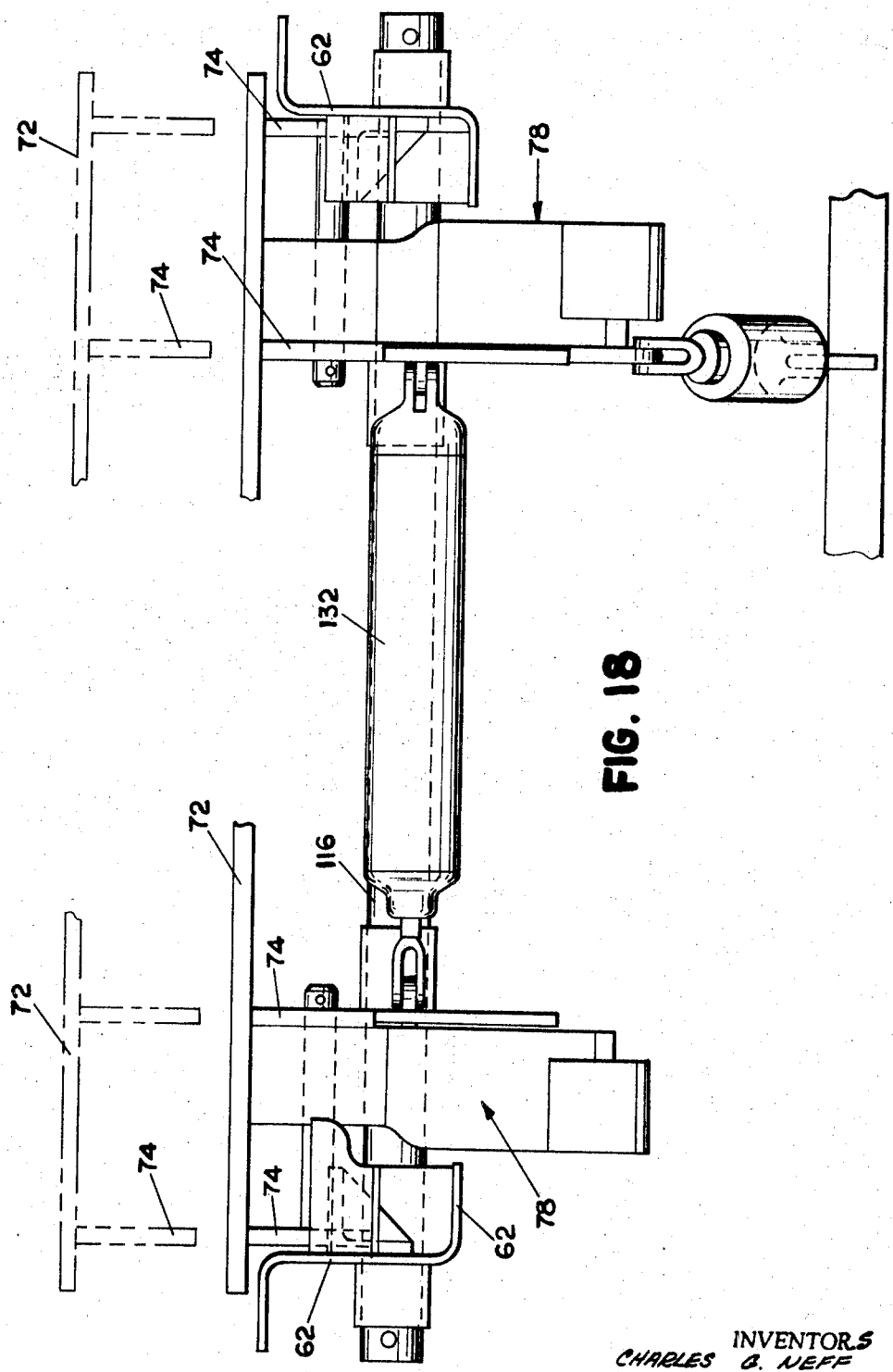

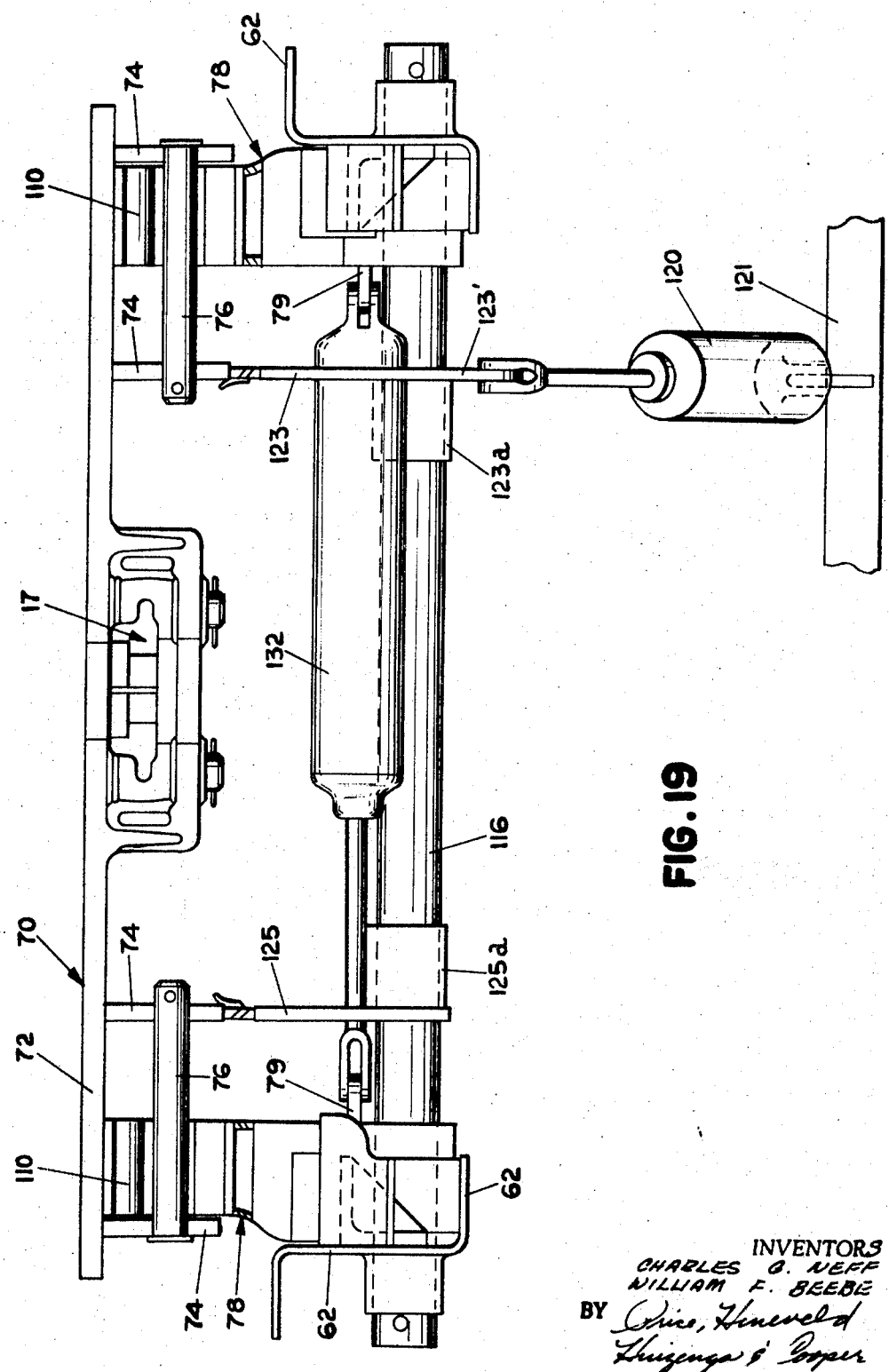

3,746,369

TRUCK TRACTOR CONVERTER DOLLY

BACKGROUND OF THE INVENTION

This invention relates to a dolly for semi-trailer hauling and more particularly to a versatile dolly usable alternately in tandem axle relation to a truck tractor or to haul a second trailer.

Dollies of various types for hauling semi-trailers are used currently by the trucking industry. They provide a certain flexibility relative to hauling two shorter trailers, for example, or one long trailer. Unfortunately, these conventional dollies must normally be custom made for each truck manufacturer. Also, they require use of a round axle as opposed to square, rectangular, or other shaped axles. And, as is well known in the industry, use of such a dolly fixedly coupled to a tractor in tandem fashion presents traction difficulties, especially on rough or uneven terrain or over a street curb, because of the tendency of the dolly to lift a drive wheel partially or completely off the ground.

Because of these factors, among others, present use of such dollies results in significant disadvantages as well as advantages.

SUMMARY OF THE INVENTION

The novel dolly of the present invention provides several unique features. It provides a converter dolly that not only has the usual advantages but also removes disadvantages of conventional units. The novel dolly need not be custom made in various forms to suit the truck tractors of several manufacturers. It is not limited to round axle constructions. It enables effective tractor traction even on uneven or rough terrain, or over curbs.

The novel dolly has a special extensible-retractable draw tongue assembly for alternate use on the rear of a trailer and on the rear of a tractor.

The novel dolly, has a construction such that, when it is coupled to a tractor, limited rotational capacity is effected relative to its tongue, enabling the wheeled axle assembly thereof to accommodate uneven terrain without lifting tractor drive wheels off the ground surface.

The novel dolly provides a fifth wheel shiftable between a lowered, collapsed non-support position, and a specially supported elevated hauling and support position.

These and other objects, advantages, and features of the invention will be apparent upon studying the following specification with the drawings.

BRIEF DESCRIPTION OF THE DRAWINGS

FIG. 1 is an elevational view of the novel dolly, a truck tractor, and a trailer, showing the converter dolly relative to both of its alternative uses with respect to the truck tractor and trailer apparatus;

FIG. 3 is an elevational view of a truck tractor and trailer shown in conventional form without the novel dolly;

FIG. 6 is a front perspective view of the dolly showing the fifth wheel elevated and the tongue extended, as it is arranged for use between two trailers;

FIG. 7 is a perspective rear view of the novel dolly;

FIG. 8 is an elevational sectional view of the dolly;

FIG. 9 is a fragmentary plan view of the dolly shown attached to the rear of a truck tractor frame for tandem arrangement therewith;

FIG. 16 is an elevational view of one of the fifth wheel supporting shoe brackets on the novel dolly;

FIG. 17 is a sectional view of the brackets in FIG. 16 taken on the section lines XVII—XVII;

FIG. 18 is an elevational view of a portion of the dolly, shown with the fifth wheel lowered; and FIG. 19 is an elevational view as in FIG. 18, but with the fifth wheel elevated.

DESCRIPTION OF THE PREFERRED EMBODIMENT

Figure 2:
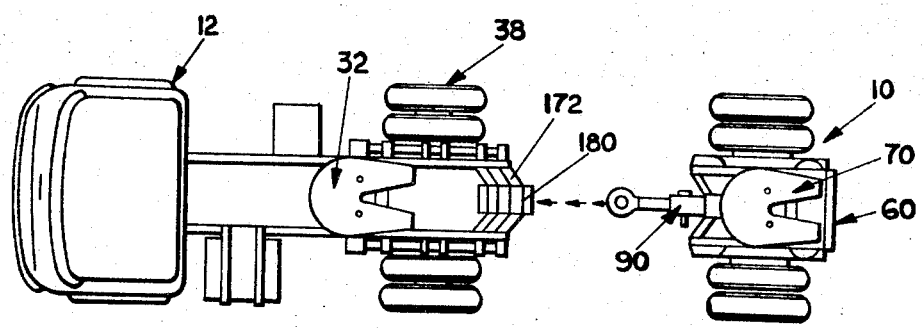
FIG. 2 is a plan view of a truck tractor and the novel dolly of FIG. 1.
Figure 4:
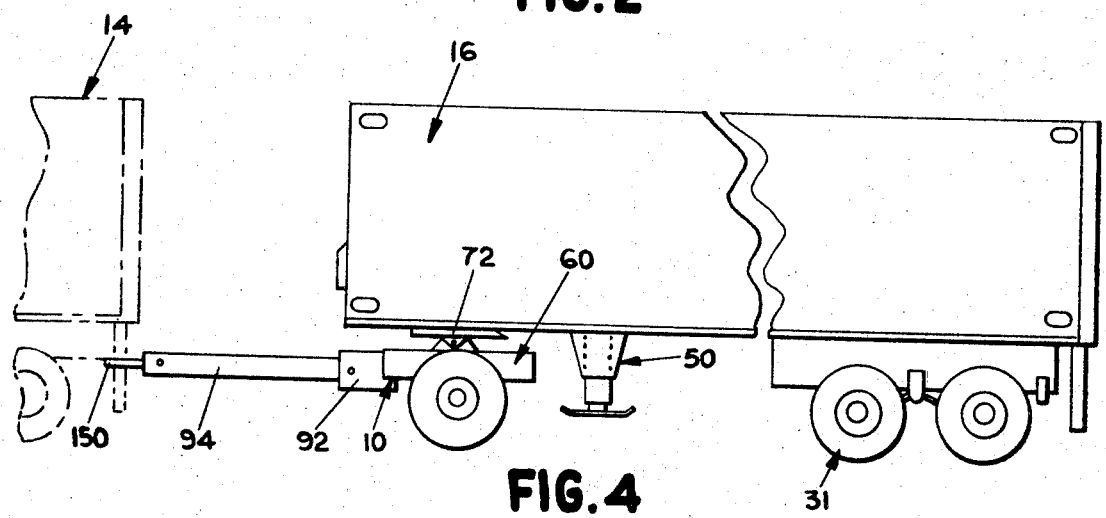
FIG. 4 is an elevational view of the novel dolly shown attached to the rear of one trailer and hauling a second trailer.

Referring now specifically to the drawings, the novel dolly 10 can be converted for use in tandem combination with a truck tractor assembly 12 (as shown by the phantom lines in FIG. 1) for hauling a single trailer 14, or alternatively for use to haul a second trailer 16 by attachment to the rear of trailer 14 as shown by FIG. 4.

Truck tractor 12 includes a conventional cab 34, a front axle subassembly 36, and a rear axle subassembly 38, the latter being powered by a suitable engine (not shown) through a drive shaft mechanism 40. The tractor has a fifth wheel assembly 32 which is forwardly and rearwardly slidably adjustable, preferably of the type in U. S. Pat. No. 2,985,463. Thus, it can be shifted from the forward position illustrated by the phantom lines in FIG. 1, when used with the tractor in conventional fashion as in FIG. 3, or shifted to the solid line rearward position above or to the rear of drive axle assembly 38 as shown in FIG. 1, when dolly 10 cooperates with the truck tractor frame to form a tandem rear axle unit as shown specifically in FIG. 10.

Trailer 14, shown as an illustration of the single or front trailer, is depicted as having a single rear axle mechanism 30, and a conventional landing gear 51. Obviously the rear axle could be dual as is illustrated on trailer 16 at 31, and the landing gear could vary. Trailer 16 also has a landing gear 50. Both trailers 14 and 16 have a depending conventional king pin on the front end thereof, as shown for example at 15 on trailer 16 (FIG. 1), for engaging a fifth wheel.

Dolly assembly 10 includes a frame subassembly 60, a fifth wheel subassembly 70, a wheeled axle subassembly 80, and an extensible-contractable forwardly extending draw tongue subassembly 90.

Framework subassembly 60 includes a pair of forwardly and rearwardly extending, laterally positioned, spaced, side beams 62, each of ⌐ shape in cross section, interconnected by rear cross-tie 64, central cross-tie 66 and front cross-tie 68. The front end of the frame includes a pair of diagonally inwardly and rearwardly oriented members 69a and 69b. These define a generally V-shaped, forwardly facing, receiving and aligning recess for cooperation with the rear end of a truck tractor frame interconnected therewith. Any truck tractor slightly modified in a uniform fashion as taught herein, can be utilized with this dolly structure as explained hereinafter.

Figure 11:
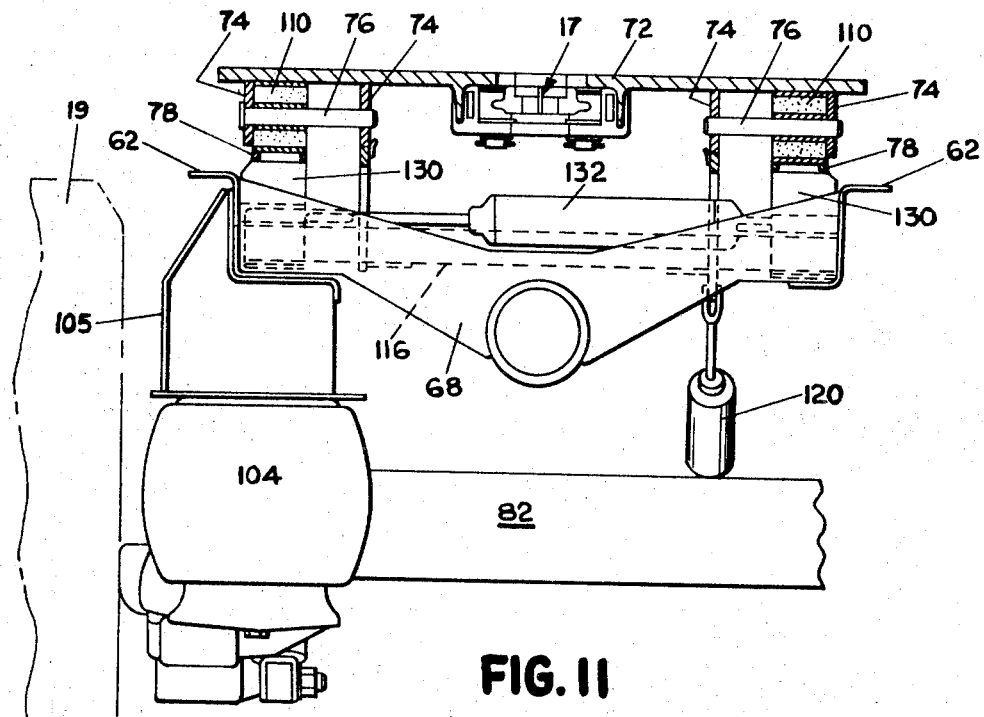
FIG. 11 is a fragmentary sectional view taken on plane XI—XI of FIG. 8.

This frame subassembly 60 and all components thereon are supported by an underlying transverse axle subassembly 80. This includes an axle 82, preferably of rectangular cross-sectional configuration, and axle mounting brackets 84. The brackets are connected to a pair of stabilizing pivot rods 86 (FIG. 8) which extend forwardly from the axle and are connected to downwardly depending flanges 88 from the frame. The axle is also secured to the central portion of a pair of laterally spaced leaf springs 102 attached at their forward ends to flanges 88 and attached at their rearward ends to the bottom of a pair of air springs 104. Springs 104 are controllably inflatable for reasons to be explained hereinafter. These springs have their lower ends attached to the rear of the leaf springs 102 and have their upper ends supporting the rear of the framework by being attached to mounts 105 which underlie beams 62 (FIG. 11). Also, conventional shock absorbers 106 are attached at their lower ends to the axle brackets and at their upper ends to flanges 88. Wheels 19 mount the axle.

Figure 5:
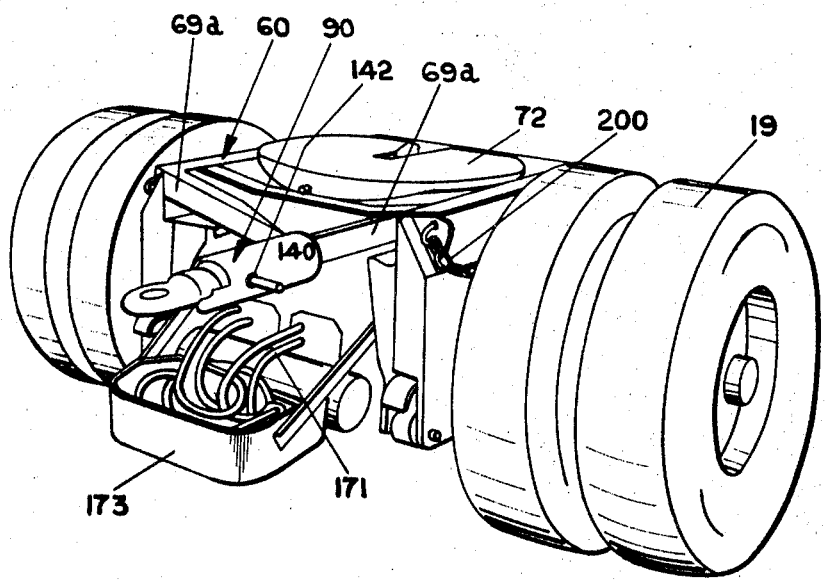
FIG. 5 is a front perspective view of the novel dolly, with its fifth wheel in lowered condition and its tongue in retracted condition, as it is arranged for use with the tractor.

Mounted on framework 60 in a unique fashion is fifth wheel subassembly 70. Fifth wheel subassembly 70 includes a conventional fifth wheel 72 having a bifurcated tapered rear portion to receive a conventional king pin on a trailer. The fifth wheel uses any suitable lock-jaw arrangement 17 (FIG. 11) as shown for example in U. S. Pat. No. 2,982,566. This fifth wheel is uniquely mounted and supported, capable of being positioned in a lowered or collapsed position of nonsupport as in FIGS. 5 and 10, or in an elevated support condition as in FIG. 8. Depending from each of the opposite lateral edges of the fifth wheel is a pair of spaced flanges 74 (FIGS. 8 and 11). These flanges are attached by a pair of aligned pins 76 to the upper ends of a pair of special, laterally spaced, laterally slidable pivot shoe brackets 78.

Each of shoe brackets 78 includes two transversely oriented pivot connections, the upper pivot connection including a cylindrical bearing 110 (FIGS. 16, 17 and 11) to receive the support pins 76 for the fifth wheel. Bearings 110 on the brackets are coaxially aligned with each other. The coaxial axes of these are also parallel with the coaxial axes of pivot sockets 114 on the lower portion of the brackets. Sockets 114 receive the elongated, transverse, cylindrical rod 116 which pivotally attaches these brackets to the framework 60.

The fifth wheel 70, along with shoe brackets 78 can be elevated to a position where shoes 78 support it in the elevated position. This is done by fluid cylinder 120 which is secured on its lower end to bar 121 between flanges 88. The upper rearward end of this diagonally oriented cylinder is attached to a pivot link 123 on its extended ear 123'. This link 123 is mounted to pivotal cross rod 116 by collar 123a and engages one of flanges 74 of fifth wheel 70. A similar line 125 also is attached to rod 116 by collar 125a to engage a flange 74 on the opposite side of the fifth wheel (FIG. 19). Thus, the fifth wheel mounted on bearings 110 can be shifted between its lowered collapsed position and its elevated position by extension of cylinder 120. Elevation of the fifth wheel is limited by engagement of a pair of cooperative stops, specifically stop 118 on bracket 78 against stop 120 on cross-member 66. Extension of fluid cylinder 120 also causes the brackets 78 to be pivoted and elevated with the fifth wheel 72. Retraction of cylinder 120 lowers the fifth wheel and the shoe brackets.

When fifth wheel 72 is in its elevated position, brackets 78 can be laterally shifted to cause fifth wheel 72 to be supported by the frame. Brackets 78 can be laterally shifted since the space between the pairs of flanges 74 is substantially greater than the width of brackets 78. The lowered brackets 78 cannot be shifted outwardly since they would engage frame members 62. (See FIG. 18). When the brackets are elevated, and are laterally outwardly shifted to a position adjacent outer flanges 74, they are vertically above the inwardly extending lower flange of dolly frame members 62. Hence, load placed on fifth wheel 72 is applied to the dolly frame through these compression loaded bracket shoes 78.

These ⌐ shaped beams 62 are positioned in mirror image fashion, with their lower inner flanges capable of underlying brackets 78, the intermediate legs extending vertically along side the brackets to provide lateral support, and the upper members extending outwardly. These brackets are laterally shifted inwardly and outwardly by contraction and extension, respectively, of fluid cylinder 132. The cylinder is attached at its opposite ends to flanges 79 on the inner faces of the mirror image brackets. The fifth wheel cannot be lowered while these brackets are outwardly shifted. The entire load on the fifth wheel rests upon these and thus upon side members 62 which in turn are supported by air springs 104.

Fifth wheel 72 is purposely placed in the elevated position when the dolly is attached to the rear end of another trailer, to connect the king pin of a second trailer therebehind. Fifth wheel 72 is purposely placed in the lowered position when the dolly is used as a tandem axle unit attached specially to the rear of a truck tractor. Suitable controls and/or locks can be employed to prevent shoes 78 from retracting accidentally when a load is on the fifth wheel.

Figure 12:
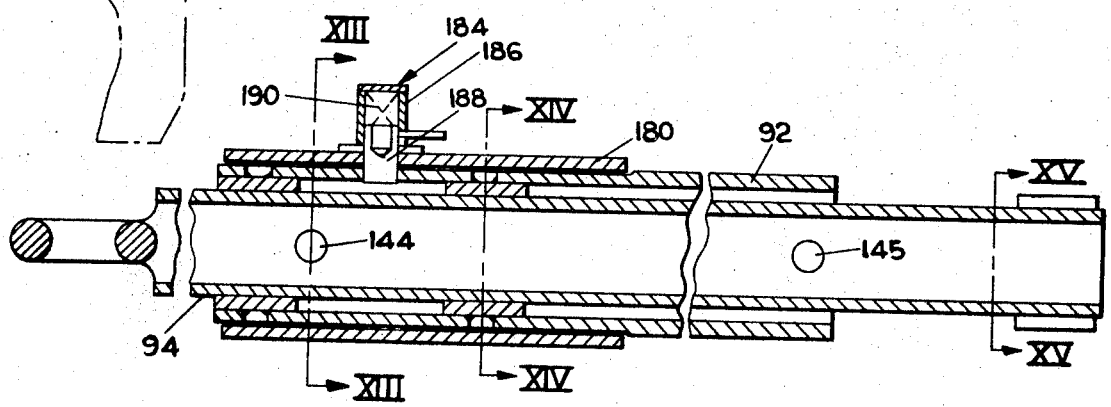
FIG. 12 is an enlarged elevational view of the tongue assembly of the novel dolly, and the coupling portion of the truck tractor to which the tongue is attached in FIG. 10.
Figures 13, 14:
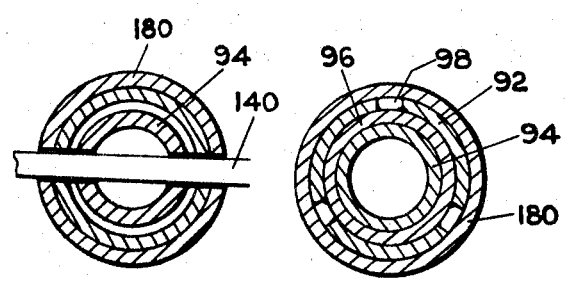
FIG. 13 is a sectional view taken on plane XIII—XIII of FIG. 12.
FIG. 14 is a sectional view taken on plane XIV—XIV of FIG. 12.
Figure 15:
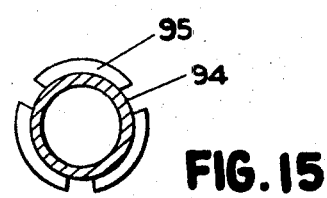
FIG. 15 is a sectional view taken on plane XV—XV of FIG. 12.

The tongue assembly 90 is specially arranged to be retractable when used in combination with a truck tractor, and to be extendable when used in combination with the rear of a trailer. This tongue assembly 90 includes an outer sleeve 92 which is affixed to crossmembers 66 and 68 of frame subassembly 60 (FIG. 9) and extends forwardly thereof. Fitted within fixed sleeve member 92 is an elongated tongue 94. Tongue member 94 is forwardly and rearwardly slidable within sleeve 92. Preferably a plurality of bearing members 96 are provided at spaced intervals therebetween, and are attached to outer sleeve member 90 as by bosses 98 protruding into and welded to member 92. These annular bearings allow the tongue subassembly to be converted between the retracted position (FIG. 5) and the extended position (FIG. 6). Extension of the tongue is limited by radially extending stops 95 (FIG. 15) on the inner rear end of tongue 94 to engage the rear end of sleeve 92. The tongue assembly is locked in either of these positions by a cross pin or rod 140 (FIG. 5) that extends through enlarged openings 142 in sleeve 92 and through either of the two aligned openings 144 at the front or 145 at the rear of member 94 (FIG. 12). This pin normally has a safety key 148 (FIG. 6) extending through its protruding end to retain it in position through the tongue members. The forward end of tongue 94 has a lunette 150 for cooperative engagement with a pintle hook of conventional type on the rear end of a trailer e.g. trailer 14.

A suitable support jack 101 (FIG. 7) which can be elevated to a non-support position, or lowered as shown to a support position, is used to hold the dolly stable when not attached to any vehicle.

Figure 10:
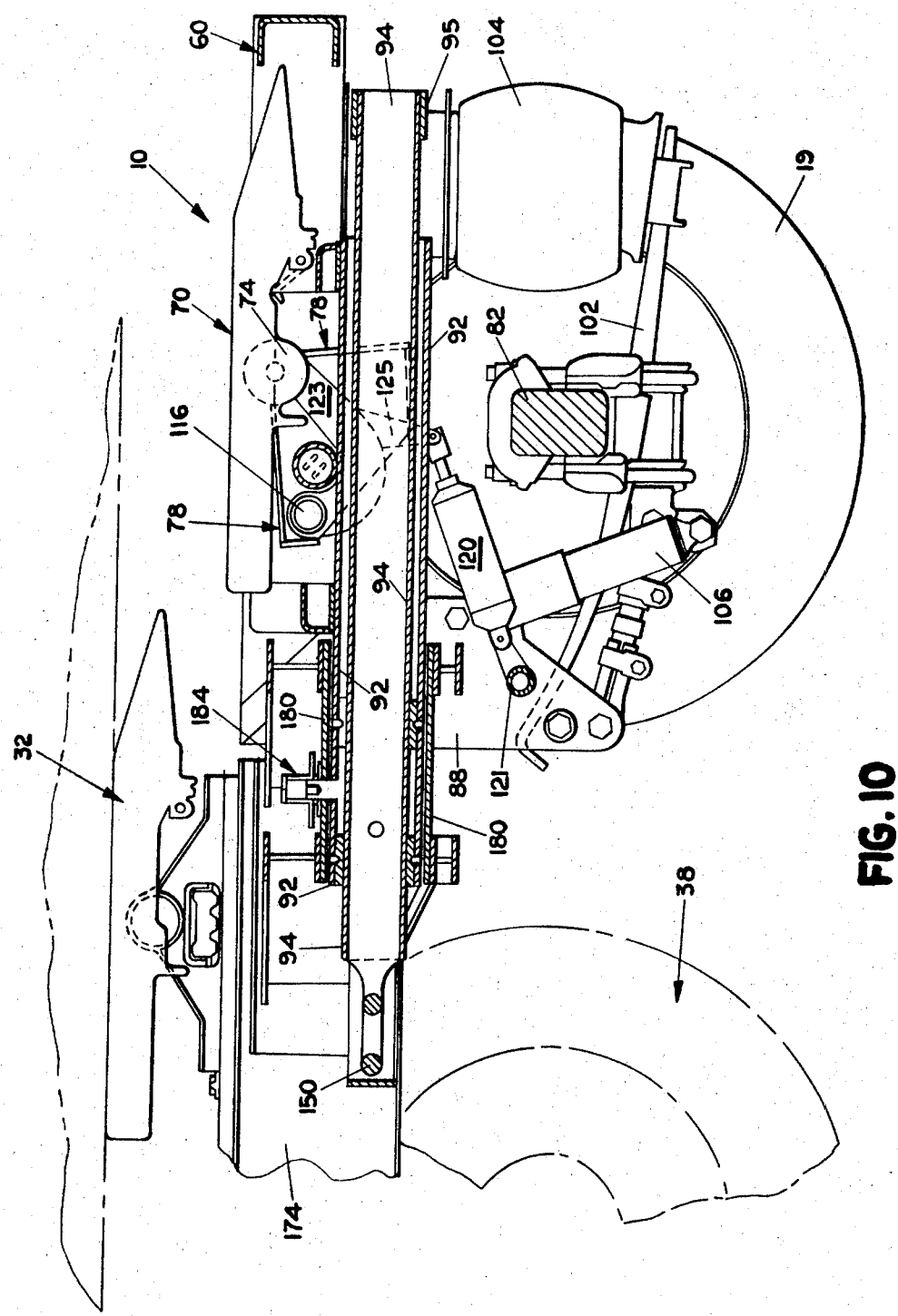
FIG. 10 is a sectional elevational view of the novel dolly shown attached to a truck tractor and used as a tandem axle component.

The truck tractor of any truck manufacturer may be quickly adapted for cooperative use with this dolly. Once this minor conversion is made to the truck tractor, the dolly can be used in cooperation therewith as a tandem axle unit or to tow a second trailer. Specifically, referring to FIG. 9 and 10, the two cross-members 170 and 172 between the side channel frame elements 174 of the truck tractor are given a generally V-shaped rearwardly protruding configuration matching that of the forward end of the dolly frame. Suitable bumper members 175 can be mounted to this protrusion (FIG. 9). Also, a tubular sleeve 180 having an open rear end and slightly larger in diameter than sleeve 92, is fixedly mounted to members 170 and 172 on the center line of the truck. When the tongue assembly 90 of the dolly is in its retracted position, member 180 can receive lunette 150, the protruding portion of tongue member 94, and a segment of outer sleeve 92 affixed to the dolly as illustrated in FIGS. 9 and 10. Member 180 and sleeve 92 are telescopically interengaged. These are coupled together preferably by a plurality, here three, of radially inwardly extending lock pin subassemblies 184 that can be manually radially outwardly shifted to a release position or spring biased to an inserted locking position. These lock pin subassemblies 184 include an outer hollow housing 186 within which a pin 188 is slidably movable radially relative to the tongue subassembly, The pin 188 is spring biased by compression spring 190 between it and the housing to an inner position where it projects into an arcuate slot 192 in collar 92 (FIG. 6). This arcuate slot or opening 192 is of greater arcuate extent than the diameter of pin 188 in each instance to allow a limited arcuate movement between the tongue subassembly on the dolly and the receiving sleeve 180. This allows a limited degree of rotational shifting of the dolly relative to the tractor, around the axis of the tongue, when the dolly is so attached to the tractor in tandem fashion.

In addition, the dolly unit will include the usual pneumatic hoses or lines 171 (FIG. 5) which, when not connected, are preferably stored in a receiving bin 173 in the front of the dolly, beneath the tongue assembly as shown. Also, suitable safety chain 200 (FIG. 6) are employed.

In use, when the novel dolly is to be used as the tandem axle unit of a truck tractor, assuming it has been used as a converter dolly or has been sitting idle, the truck driver manually retracts the tongue assembly to its retracted position, aligns the tongue with the tubular opening in the rear of the cross frame of the tractor, connects the air hoses to the tractor from the dolly, elevates the air bags on the dolly to put the dolly chassis at the height of the tractor frame, sets the brakes on the dolly from the cab, backs the tractor into the dolly to couple them, i.e. so that the cuff or sleeve on the tractor receives the prong or tongue on the dolly, secures the safety pins in place manually, connects the electrical lines for the lights, lowers the dolly fifth wheel so that the fifth wheel on the tractor can be used without interference from the dolly fifth wheel (see FIG. 10), and raises the jack support 101 (FIG. 7) used to stabilize the dolly when sitting idle. This results in a three axle tractor capable of pulling large semi-heavy duty trailers e.g. 40 foot units. The dolly axle acts as the third tractor axle because of the interengagement of the fixed elongated sleeve 92 on the dolly and the fixed elongated sleeve 180 on the tractor, as reinforced by the cooperative engagement of the V-shaped protrusion and recess on the rear of the tractor and front end of the dolly, respectively.

When these are so coupled together, the truck driver can redistribute the load relative to the new third axle by adjusting the position of the fifth wheel 32 on the tractor, and adjusting the air pressure in the air bag springs 104 on the dolly.

To uncouple the dolly when it has been used as a tandem axle unit on a tractor, the driver disconnects the electrical plugs, pulls out the safety bar and spring loaded pins securing the dolly tongue to the tractor sleeve, lowers the jack support on the dolly, and drives the cab away to disconnect it. He then disconnects and stows the air lines in the bin at the front of the dolly.

Then, assuming that the dolly is to be used at the rear of a trailer, to haul a second trailer, he manually pulls out the draw bar tongue and locks it into the extended position with the safety bar. He hooks the lunette or eye of the drawbar onto the coupler or pintle of the pulling trailer vehicle. The air lines are hooked up, the dolly frame is elevated to the proper height with the air springs, the fifth wheel 70 is elevated to the proper height by activating cylinder 120, and cylinder 132 is activated to shift the brackets above the side frame members 62. Then the coupled elevated fifth wheel on the dolly is connected to the rear trailer. This fifth wheel is locked on the king pin of the rear trailer, and the electrical lines are attached to it, as well as the air lines and safety chains.

It should be understood that this dolly, when so used, can be placed under the second trailer manually, or by connecting it to the back of a cab and backing it into place, or by connecting it to the front of the cab and driving it into place under the trailer. When the dolly is in place under the second trailer, the truck with the first trailer is backed up to it, and the pintle and lunette connection are completed.

It is conceivable that certain structural variations could be made in the details of the construction illustrated as the preferred embodiment, without departing from the concept presented herein. Hence, it is intended that the unique invention set forth herein should be limited only by the scope of the appended claims rather than by the specific embodiment set forth as illustrative of the invention.

The embodiments of the invention in which an exclusive property or privilege is claimed are defined as follows:

1. A trailer support and hauling dolly for use between a truck tractor and a following trailer or between the rear of a front trailer and the front of a rear trailer, comprising: a frame having a wheeled axle assembly thereunder, a pull tongue assembly extending forwardly thereof, and a fifth wheel thereon; fifth wheel support means pivotally mounted on said frame and shiftable vertically with respect to said frame to shift said fifth wheel between a raised trailer coupling and towing position and a lowered non-coupling position; powered means for shifting said support means and said fifth wheel between said raised and lowered positions, said frame and said support means adapted for cooperative engagement to place said support means in compression load between said fifth wheel and said frame and thereby hold said fifth wheel in said raised position; at least portions of said support means being shiftable into said cooperative engagement with said frame; and powered means operably connected between said frame and said support means portions and arranged for shifting said support means portions into engagement with said frame when said fifth wheel is in said raised position.

2. The dolly in claim 1 wherein said fifth wheel support means includes bracket means pivotally attached to said frame and vertically shiftable relative thereto and pivotally attached to said fifth wheel; and power shifting means operably arranged to shift said fifth wheel and bracket means vertically between said positions.

3. The dolly in claim 2 wherein said power shifting means comprises fluid cylinder means attached to said frame and operable on said fifth wheel support means.

4. The dolly in claim 2 including bracket stop means positioned to limit upward vertical shifting of said bracket means and the fifth wheel thereon.

5. The dolly in claim 1 wherein said fifth wheel support means is laterally shiftable between a non-supporting position allowing said fifth wheel to be vertically shifted between its raised and lowered positions, and a fifth wheel support position directly vertically between said dolly frame and said fifth wheel when in its raised position.

6. The dolly in claim 5 wherein said fifth wheel support means comprises a pair of support shoes shiftable laterally of said dolly frame in opposite directions to each other, between a laterally inwardly non-support position and a laterally outwardly support position.

7. The dolly in claim 1 wherein said wheeled axle assembly includes variable capacity air spring means operably positioned to elevate said frame with respect to the axle assembly for regulating the load thereon when said dolly is connected to the rear of a truck tractor in tandem axle fashion.

8. A trailer support and hauling dolly for use in combination with a truck tractor, between the tractor and a following trailer in tandem axle fashion with the rear axle of the tractor, and convertible for use between the rear of a front trailer and the front of a rear trailer, comprising:

a frame having a wheeled axle assembly thereunder, and a fifth wheel assembly thereon;

a tongue assembly extending forwardly of said frame and having connection means, said tongue assembly being extendable for connection with the rear of a front trailer and being retractable for connection with the rear of the tractor;

position locking means for said tongue assembly operable to lock said tongue assembly in its extended position or in its retracted position;

receiving means on the tractor for said tongue assembly, said receiving means and said tongue assembly being telescopically interengageable;

securement means on said receiving means and said tongue assembly, said securement means including cooperative pins and pin-receiving openings, said pins and pin-receiving openings being arranged to allow limited rotational movement between said receiving means and said tongue assembly about the axis of said tongue assembly when connected in tandem with the rear of said tractor, for accommodation of uneven terrain.

9. The combination of claim 8 wherein said tongue assembly includes a sleeve fixed to said frame and a tongue member slidably mounted in said sleeve, said sleeve being telescopically interengageable with said receiving means on said tractor, said securing means including said sleeve having arcuate slots therein forming said pin-receiving openings and said pins being mounted on said receiving means for positioning in said arcuate slots to thereby allow said limited rotational movement therebetween.

10. The combination as defined in claim 9 and further including radially extending stop means on said tongue member cooperable with said sleeve to limit extension of said tongue with respect to said frame.

11. The combination in claim 9 and further including powered fifth wheel positioning and support means between said frame and said fifth wheel, operable to shift said fifth wheel between a lowered non-coupling position and a raised trailer coupling and towing position.

12. A combination in claim 11 wherein said fifth wheel positioning and support means includes means for laterally shifting said support means between said frame and said fifth wheel assembly to support said fifth wheel in said raised position.

13. The combination in claim 12 wherein said positioning and support means includes a pair of bracket members attached to said frame at opposite sides thereof, said bracket members being vertically and laterally shiftable relative to said frame and attached to said fifth wheel; and said laterally shifting means including power means operably connected between said bracket members for shifting said bracket members laterally between said frame and said fifth wheel assembly for supporting same in said raised position.

14. A truck tractor and a trailer support and hauling dolly for use between the truck tractor and a following trailer, and alternately useable between the rear of a front trailer and the front of a rear trailer, comprising: a dolly frame having a wheeled axle assembly thereunder, and a fifth wheel thereon; fifth wheel support means pivotally mounted on said frame and shiftable vertically with respect to said frame to shift said fifth wheel between a raised trailer coupling and towing position and a lowered noncoupling position; powered means for shifting said support means and fifth wheel between said raised and lowered positions, said frame and said support means adapted for cooperative engagement to place said support means in compression load between said fifth wheel and said frame and thereby hold said fifth wheel in said raised position; at least portions of said support means being shiftable into said cooperative engagement with said frame; and powered means operably connected between said frame and said support means portions and arranged for shifting said support means portions into engagement with said frame when said fifth wheel is in said raised position; a tongue assembly extending forwardly of said frame and having connection means, said tongue assembly being extensible for connection with the rear of a front trailer and being retractable for connection with the rear of said truck tractor in tandem axle fashion with the rear axle of said tractor; position locking means for said tongue assembly operable to lock it in its extended position or in its retracted position; said truck tractor including receiving means for said tongue assembly; securement means operable to secure said tongue assembly to said receiving means; said securement means allowing limited rotational movement of said dolly frame about the axis of said tongue assembly when said dolly is connected to the rear of said truck tractor.

* * * * *